United States Patent
Wang et al.

(10) Patent No.: US 12,070,856 B2
(45) Date of Patent: Aug. 27, 2024

(54) ROBOT BALANCE CONTROL METHOD, ROBOT USING THE SAME, AND COMPUTER READABLE STORAGE MEDIUM

(71) Applicant: UBTECH ROBOTICS CORP LTD, Shenzhen (CN)

(72) Inventors: Hongge Wang, Shenzhen (CN); Chunyu Chen, Shenzhen (CN); Yizhang Liu, Shenzhen (CN); Ligang Ge, Shenzhen (CN); Jie Bai, Shenzhen (CN); Xingxing Ma, Shenzhen (CN); Jiangchen Zhou, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 316 days.

(21) Appl. No.: 17/557,076

(22) Filed: Dec. 21, 2021

(65) Prior Publication Data
US 2022/0193896 A1 Jun. 23, 2022

(30) Foreign Application Priority Data
Dec. 22, 2020 (CN) .......................... 202011532376.9

(51) Int. Cl.
*B25J 9/16* (2006.01)
*B62D 57/02* (2006.01)
*G05B 19/41* (2006.01)
*G05B 19/4155* (2006.01)

(52) U.S. Cl.
CPC .......... *B25J 9/1605* (2013.01); *B25J 9/1633* (2013.01); *B62D 57/022* (2013.01); *G05B 19/4155* (2013.01); *G05B 2219/50391* (2013.01)

(58) Field of Classification Search
CPC ..... B25J 9/1605; B25J 9/1633; B62D 57/022; B62D 57/032; G05B 19/4155; G05B 2219/50391; G05D 1/0891
See application file for complete search history.

(56) References Cited

U.S. PATENT DOCUMENTS

| 8,942,848 | B2* | 1/2015 | Pratt | B62D 57/032 700/250 |
| 10,576,620 | B1* | 3/2020 | Chou | A61F 5/0102 |
| 2008/0133053 | A1* | 6/2008 | Pratt | B62D 57/032 901/1 |
| 2017/0036346 | A1* | 2/2017 | Kamioka | B62D 57/032 |
| 2019/0118385 | A1* | 4/2019 | Xiong | B25J 17/00 |
| 2019/0196477 | A1* | 6/2019 | Xiong | B62D 57/032 |

FOREIGN PATENT DOCUMENTS

CN 111674486 A 9/2020

* cited by examiner

*Primary Examiner* — Kira Nguyen

(57) ABSTRACT

A robot balance control method as well as a robot using the same and a computer readable storage medium are provided. In the method, a brand new flywheel model different from the existing flywheel model is created. In this flywheel model, the foot of the support leg of the robot is equivalent to the massless link of the flywheel model, while rest parts of the robot are equivalent to the flywheel of the flywheel model. Compared with the various models in the prior art, this flywheel model is more in line with the actual situation of the robot during the monoped supporting period. By controlling the posture of the foot of the support leg based on this flywheel model, a better balance effect can be achieved, which avoids the overturning of the robot.

20 Claims, 6 Drawing Sheets

ROBOT BALANCE CONTROL METHOD, ROBOT USING THE SAME, AND COMPUTER READABLE STORAGE MEDIUM

CROSS REFERENCE TO RELATED APPLICATIONS

The present disclosure claims priority to Chinese Patent Application No. 202011532376.9, filed Dec. 22, 2020, which is hereby incorporated by reference herein as if set forth in its entirety.

BACKGROUND

1. Technical Field

The present disclosure relates to robot technology, and particularly to robot balance control method as well as a robot using the same and a computer readable storage medium.

2. Description of Related Art

Compared with wheeled and crawler robots, a big advantage of biped robots is that they can adapt to the living environment of humans so as to, for example, walking on uneven ground and going up and down stairs. In the prior art, through various balance control algorithms, it has been possible to maintain the balance of a biped robot during its biped supporting period. However, during its monoped supporting period, its balance will be difficult to maintain because only one leg is in contact with the ground, and will be very easy to cause the overturning of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
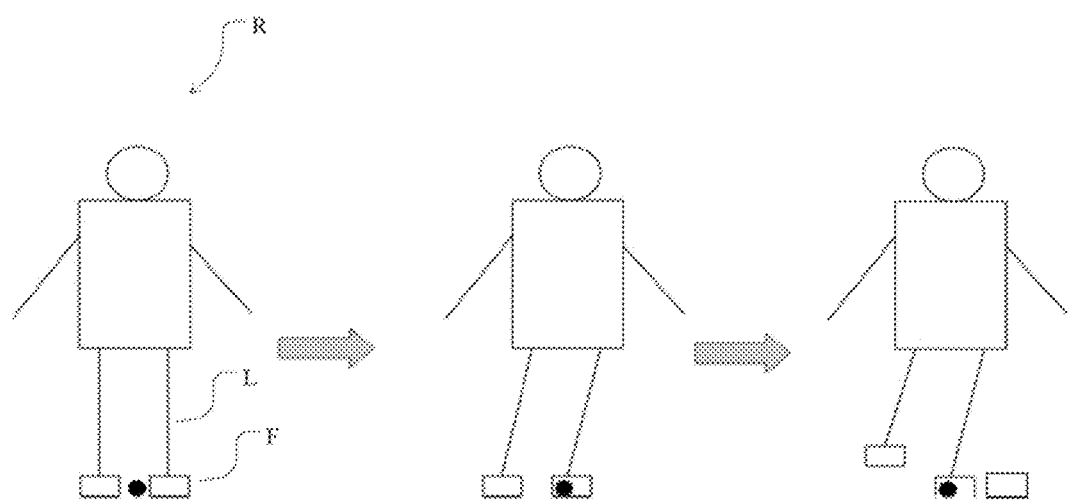
FIG. 1 is a schematic diagram of the process of switching the biped robot from biped support to monoped support according to an embodiment of the present disclosure.

A biped robot is prone to instability when switching from biped support to monoped support. In the embodiments of the present disclosure, in order to avoid the robot from overturning, the switching process may be divided into two steps. In the first step, the body of the robot is moved to close to the expected support leg while the zero moment point (ZMP) of the entire robot is continuously detected. In the second step, if the ZMP of the entire robot is detected to stably fall within a supporting area of the expected support leg, the expected suspending leg will be lift so as to achieve the switch from biped support to monoped support. FIG. 1 is a schematic diagram of the process of switching the biped robot from biped support to monoped support according to an embodiment of the present disclosure. As shown in FIG. 1, he black solid circle is the above-mentioned ZMP. For the sake of simplicity, unless otherwise specified, the robots mentioned in the embodiments of the present disclosure are all biped robots.

When the robot R is supported with one leg L, the ZMP may be controlled to fall within the supporting area to maintain the stability of the robot R. However, the control of the ZMP of the robot requires high force control accuracy, and the accurate control will be difficult. Therefore, in the embodiments of the present disclosure, a new control goal is proposed. In which, the posture of the foot F of the support leg of the robot in the world coordinate system is controlled to avoid the flip of the foot so as to ensure the stability of the robot. When correcting the posture of the foot of the robot, it only needs to ensure that the direction of the torque of the ankle of the robot relative to the foot is opposite to the error of the posture of the foot, which reduces the requirement for the accuracy of the force control of the ankle.

When the robot is supported with one leg, it can be equivalent to a flywheel model. Generally, the entire support leg of the robot may be equivalent to a massless link of the flywheel model, while the parts of the robot other than the support leg may be equivalent to the flywheel. However, because the mass of the leg of the biped robot is relatively large, there will be a larger error when it is equivalent to a massless link.

Figure 2:
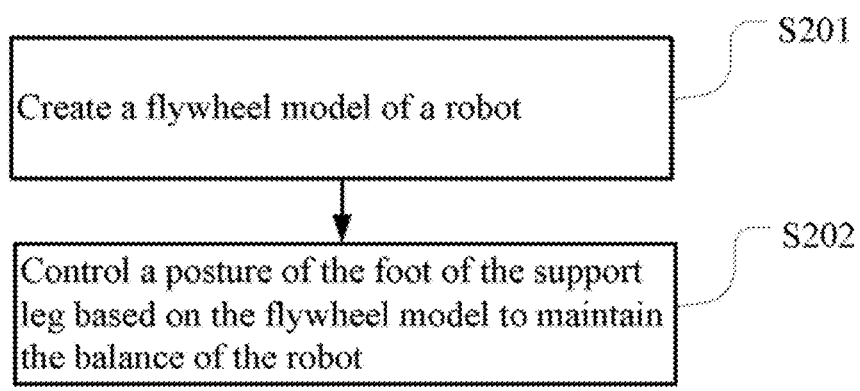
FIG. 2 is a flow chart of a robot balance control method according to an embodiment of the present disclosure.

Based on the forgoing considerations, in the embodiments of the present disclosure, a brand new flywheel model different from the existing flywheel model is created, so as to control the posture of the foot of the support leg based on this flywheel model, thereby achieving a better balance effect. FIG. 2 is a flow chart of a robot balance control method according to an embodiment of the present disclosure. A robot balance control method is provided. In one embodiment, the robot balance control method is a computer-implemented method executable for a processor, which may be applied to the above-mentioned robot. The robot has a body and two legs each including a foot. The method may be implemented through a robot balance control apparatus shown in FIG. 5 or a robot shown in FIG. 6. As shown in FIG. 2, the method may include the following steps.

S201: creating a flywheel model of the robot.

Figure 3:
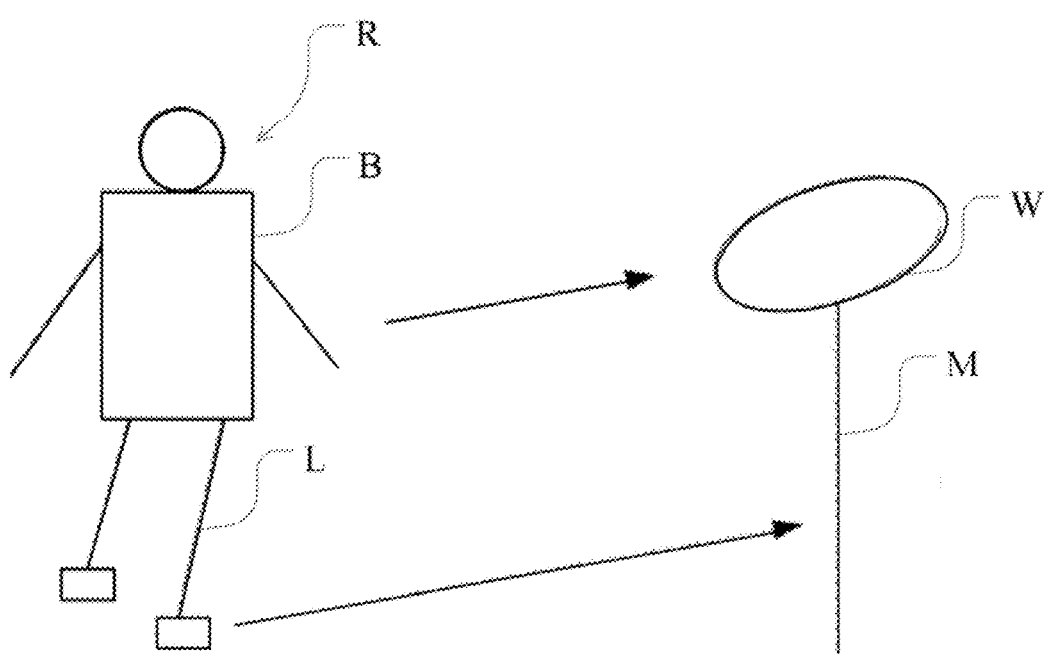
FIG. 3 is a schematic diagram of a flywheel model according to an embodiment of the present disclosure.

FIG. 3 is a schematic diagram of a flywheel model according to an embodiment of the present disclosure. As shown in FIG. 3, the foot of the support leg L of the robot (i.e., one of the legs of the robot that supports the robot) is equivalent to a massless link M of a flywheel model (e.g., a Linear Inverted Pendulum plus Flywheel Model), and rest parts of the robot are equivalent to a flywheel W of the flywheel model. The posture of the foot of the support leg L can be controlled through the rotation of the flywheel W.

S202: controlling a posture of the foot of the support leg based on the flywheel model to maintain the balance of the robot.

Figure 4:
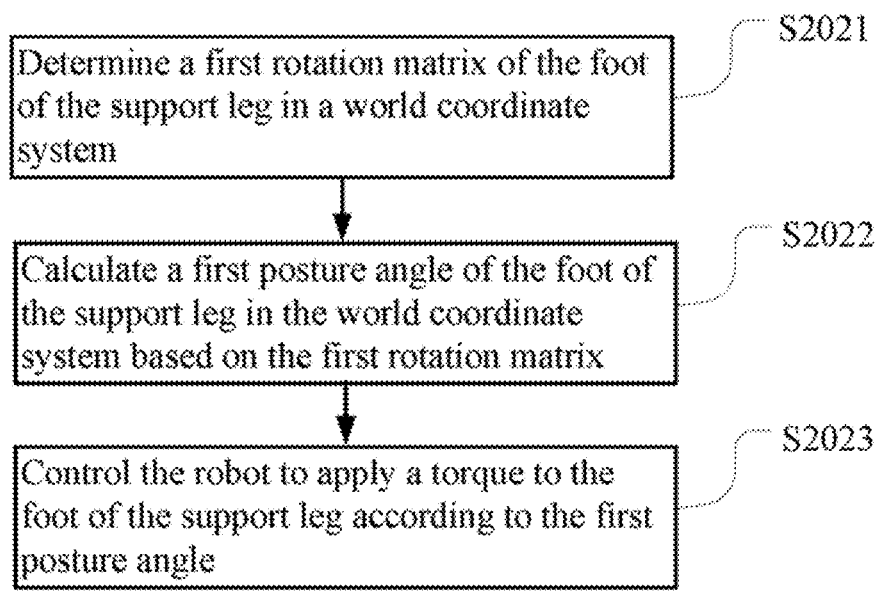
FIG. 4 is a flow chart of controlling the posture of the foot of the support leg based on the flywheel model according to an embodiment of the present disclosure.

FIG. 4 is a flow chart of controlling the posture of the foot of the support leg based on the flywheel model according to an embodiment of the present disclosure.

As shown in FIG. 4, step S202 may include the following sub-steps.

S2021: determining a first rotation matrix of the foot of the support leg in a world coordinate system.

In order to facilitate the distinction, the rotation matrix of the foot of the support leg is denoted as the first rotation matrix herein. First, the posture angle of the body of the robot in the world coordinate system is obtained, which is denoted as the second posture angle for the convenience of distinguishing herein. As an example, the second posture angle may be obtained through an inertial measurement unit (IMU) installed on the body of the robot, where the second posture angle may be represented as (roll_b, pitch_b, yaw_b), where roll_b is the roll angle in the second posture angle, pitch_b is the pitch angle in the second posture angle, and yaw_b is the yaw angle in the second posture angle.

After the second posture angle is obtained, the rotation matrix of the body of the robot in the world coordinate system may be calculated based on the second posture angle, which is denoted as the second rotation matrix for the convenience of distinguishing herein.

In one embodiment, a roll angle rotation matrix, a pitch angle rotation matrix, and a yaw angle rotation matrix corresponding to a roll angle, a pitch angle, and a yaw angle in the second posture angle, respectively, are calculated; and the second rotation matrix is calculated based on the roll angle rotation matrix, the pitch angle rotation matrix, and the yaw angle rotation matrix.

Here, the roll angle rotation matrix is represented as $R_x(\text{roll\_b})$, which corresponds to the operation of taking the x axis of the world coordinate system as the rotation axis to rotate at the angle roll_b; the pitch angle rotation matrix is represented as $R_y(\text{pitch\_b})$, which corresponds to the operation of taking the y axis of the world coordinate system as the rotation axis to rotate at the angle pitch_b; and the yaw angle rotation matrix is represented as $R_z(\text{yaw\_b})$, which corresponds to the operation of taking the z axis of the world coordinate system as the rotation axis to rotate at the angle yaw_b. It should be noted that, the above-mentioned rotations should conform to the right hand screw rule, that is, when the rotation angle is positive, the rotation direction is counterclockwise and around the axis of rotation, and when the rotation angle is negative, the rotation direction is clockwise and around the axis of rotation.

The second rotation matrix is denoted as Rbody2world, then:

$$Rbody2world = R_z(\text{yaw\_b})R_y(\text{pitch\_b})R_x(\text{roll\_b});$$

where:

$$R_x(\text{roll\_b}) = \begin{bmatrix} 1 & 0 & 0 \\ 0 & \cos(\text{roll\_b}) & -\sin(\text{roll\_b}) \\ 0 & \sin(\text{roll\_b}) & \cos(\text{roll\_b}) \end{bmatrix};$$

$$R_y(\text{pitch\_b}) = \begin{bmatrix} \cos(\text{pitch\_b}) & 0 & \sin(\text{pitch\_b}) \\ 0 & 1 & 0 \\ -\sin(\text{pitch\_b}) & 0 & \cos(\text{pitch\_b}) \end{bmatrix}; \text{ and}$$

$$R_z(\text{yaw\_b}) = \begin{bmatrix} \cos(\text{yaw\_b}) & -\sin(\text{yaw\_b}) & 0 \\ \sin(\text{yaw\_b}) & \cos(\text{yaw\_b}) & 0 \\ 0 & 0 & 1 \end{bmatrix}.$$

Then, the rotation matrix of the foot of the support leg of the robot relative to the body may be determined according to forward kinematics, which is denoted as the third rotation matrix for facilitating the distinction herein. As an example, an angle feedback of the leg joints of the robot may be obtained, and the third rotation matrix may be obtained by processing the angle feedback based on forward kinematics of the leg. The specific processing process of forward kinematics can refer to any existing forward kinematics processing method, which will not be repeated herein.

After the second rotation matrix and the third rotation matrix are obtained, the first rotation matrix may be calculated based on the second rotation matrix and the third rotation matrix.

In one embodiment, the first rotation matrix may be calculated based on an equation of:

$$R\text{foot2world} = R\text{body2world} \times R\text{foot2body};$$

where, Rfoot2body is the third rotation matrix, and Rfoot2world is the first rotation matrix. The first rotation matrix, the second rotation matrix, and the third rotation matrix are all matrices with 3 rows and 3 columns.

S2022: calculating a first posture angle of the foot of the support leg in the world coordinate system based on the first rotation matrix.

In order to facilitate the distinction, the posture angle of the foot of the support leg is denoted as the first posture angle herein. The first rotation matrix is represented in the form of a matrix as:

$$Rfoot2world = \begin{bmatrix} R_{11} & R_{12} & R_{13} \\ R_{21} & R_{22} & R_{23} \\ R_{31} & R_{32} & R_{33} \end{bmatrix};$$

where, $R_{ij}$ is the element in the i-th row and the j-th column of the first rotation matrix.

The first posture angle is represented as (roll_real, pitch_real, yaw_real), where roll_real is the roll angle in the first posture angle, pitch_real is the pitch angle in the first posture angle, and yaw_real is the yaw angle in the first posture angle.

The first posture angle may be calculated based on an equation of:

$$\text{roll\_real} = a\tan 2(R_{32}, \sqrt{R_{12}^2 + R_{22}^2});$$

$$\text{pitch\_real} = a\tan 2(-R_{31}, R_{33}); \text{ and}$$

$$\text{yaw\_real} = a\tan 2(-R_{12}, R_{22}).$$

S2023: controlling the robot to apply a torque to the foot of the support leg according to the first posture angle.

In one embodiment, the torque applied to the foot of the support leg by the robot may be calculated according to differences between the actual roll/pitch angle and desired roll/pitch angle, represented by equations of:

$$\text{torque\_}x = kp\_x \times (\text{roll\_desired} - \text{roll\_real}); \text{ and}$$

$$\text{torque\_}y = kp\_y \times (\text{pitch\_desired} - \text{pitch\_real}).$$

In which, roll_desired is a preset desired value of the roll angle, and pitch_desired is a preset desired value of the pitch angle, where the values of the two may be set according to actual conditions and will not be limited herein. As an example, both of the two may be set to 0. kp_x and kp_y are preset proportional coefficients, which may be set according to actual conditions and will not be limited herein. torque_x is a component of the torque in an x-axis direction of the world coordinate system (i.e., the direction of the movement of the robot), and torque_y is a component of the torque in a y-axis direction of the world coordinate system (i.e., the left side of the robot, or the direction obtained by rotating the direction of the movement with 90 degrees counterclockwise).

In summary, in this embodiment, a brand new flywheel model different from the existing flywheel model is created. In this flywheel model, the foot of the support leg of the robot is equivalent to the massless link of the flywheel model, while rest parts of the robot are equivalent to the flywheel of the flywheel model. Compared with the various models in the prior art, this flywheel model is more in line with the actual situation of the robot during the monoped supporting period. By controlling the posture of the foot of the support leg based on this flywheel model, a better balance effect can be achieved, which avoids the overturning of the robot.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 5:
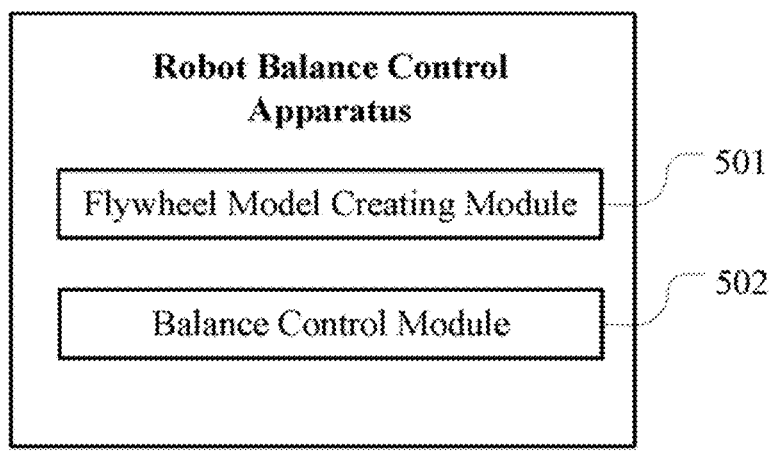
FIG. 5 is a schematic block diagram of a robot balance control apparatus according to an embodiment of the present disclosure.

FIG. 5 is a schematic block diagram of a robot balance control apparatus according to an embodiment of the present disclosure. As shown in FIG. 5, a robot balance control apparatus corresponding to the robot balance control method described in the above-mentioned embodiment is provided. The apparatus may be applied to the robot shown in FIG. 6 or the robot shown in FIG. 6 itself. In this embodiment, a robot balance control apparatus may include:

a flywheel model creating module 501 configured to equivalent a foot of a support leg of the robot to a massless link of a flywheel model, and equivalent rest parts of the robot to a flywheel of the flywheel model; and a balance control module 502 configured to control a posture of the foot of the support leg based on the flywheel model.

Furthermore, the balance control module 502 may include:

a first rotation matrix determining sub-module configured to determine a first rotation matrix of the foot of the support leg in a world coordinate system;

a first posture angle calculating sub-module configured to calculate a first posture angle of the foot of the support leg in the world coordinate system based on the first rotation matrix; and a balance control sub-module configured to control the robot to apply a torque to the foot of the support leg according to the first posture angle.

Furthermore, the first rotation matrix determining sub-module may include:

a second posture angle obtaining unit configured to obtain a second posture angle of a body of the robot in the world coordinate system;

a second rotation matrix calculating unit configured to calculate a second rotation matrix of the body of the robot in the world coordinate system based on the second posture angle;

a third rotation matrix determining unit configured to determine a third rotation matrix of the foot of the support leg of the robot relative to the body of the robot according to forward kinematics; and a first rotation matrix calculating unit configured to calculate the first rotation matrix based on the second rotation matrix and the third rotation matrix.

Furthermore, the second rotation matrix calculating unit may include:

a first calculation subunit configured to calculate a roll angle rotation matrix, a pitch angle rotation matrix, and a yaw angle rotation matrix corresponding to a roll angle, a pitch angle, and a yaw angle in the second posture angle, respectively; and a second calculation subunit configured to calculate the second rotation matrix based on the roll angle rotation matrix, the pitch angle rotation matrix, and the yaw angle rotation matrix.

Furthermore, the first rotation matrix calculating unit may be configured to calculate the first rotation matrix based on an equation of:

$$Rfoot2world = Rbody2world \times Rfoot2body;$$

where, Rbody2world is the second rotation matrix, Rfoot2body is the third rotation matrix, and Rfoot2world is the first rotation matrix.

Furthermore, the first posture angle calculating sub-module may be configured to calculate the first posture angle based on an equation of:

$$\text{roll\_real} = a\tan 2(R_{32}, \sqrt{R_{12}^2 + R_{22}^2});$$

$$\text{pitch\_real} = a\tan 2(-R_{31}, R_{33}); \text{ and}$$

$$\text{yaw\_real} = a\tan 2(-R_{12}, R_{22}).$$

where, $R_{ij}$ is the element in the i-th row and j-th column of the first rotation matrix, roll_real is the roll angle in the first posture angle, pitch_real is the pitch angle in the first posture angle, and yaw_real is the yaw angle in the first posture angle.

Furthermore, the balance control sub-module may be configured to calculate the torque applied to the foot of the support leg by the robot according to differences between the actual roll/pitch angle and desired roll/pitch angle, represented by equations of:

$$\text{torque\_}x = kp\_x \times (\text{roll\_desired} - \text{roll\_real}); \text{ and}$$

$$\text{torque\_}y = kp\_y \times (\text{pitch\_desired} - \text{pitch\_real}).$$

where, roll_real is the roll angle in the first posture angle, pitch_real is the pitch angle in the first posture angle, roll_desired is a preset desired value of the roll angle, and pitch_desired is a preset desired value of the pitch angle, kp_x and kp_y are preset proportional coefficients, torque_x is a component of the torque in an x-axis direction of the world coordinate system, and torque_y is a component of the torque in a y-axis direction of the world coordinate system.

Those skilled in the art can clearly understand that, for the convenience and conciseness of the description, the specific working processes of the above-mentioned apparatus, modules and units can refer to the corresponding processes in the foregoing method embodiments, which will not be repeated herein.

Figure 6:
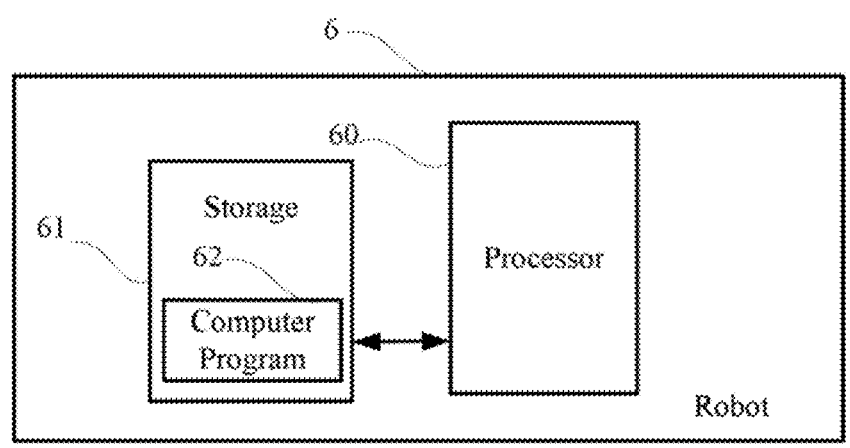
FIG. 6 is a schematic block diagram of a robot according to an embodiment of the present disclosure.

FIG. 6 is a schematic block diagram of a robot according to an embodiment of the present disclosure. For ease of description, only parts related to this embodiment are shown.

As shown in FIG. 6, in this embodiment, a robot 6 (e.g., the above-mentioned biped robot) is provided. The robot 6 includes a processor 60, a storage 61, and a computer program 62 stored in the storage 61 and executable on the processor 60. When executing (instructions in) the computer program 62, the processor 60 implements the steps in the above-mentioned embodiments of the balance control method for a robot, for example, steps S201-S202 shown in FIG. 2. Alternatively, when the processor 60 executes (instructions in) the computer program 62, the functions of each module/unit in the above-mentioned device embodiments, for example, the functions of the modules 501-502 shown in FIG. 5 are implemented.

Exemplarily, the computer program 62 may be divided into one or more modules/units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the robot 6.

It can be understood by those skilled in the art that FIG. 6 is merely an example of the robot 6 and does not constitute a limitation on the robot 6, and may include more or fewer components than those shown in the figure, or a combination of some components or different components. For example, the robot 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the robot 6, for example, a hard disk or a memory of the robot 6. The storage 61 may also be an external storage device of the robot 6, for example, a plug-in hard disk, a smart media card (SMC), a secure digital (SD) card, flash card, and the like, which is equipped on the robot 6. Furthermore, the storage 61 may further include both an internal storage unit and an external storage device, of the robot 6. The storage 61 is configured to store the computer program 62 and other programs and data required by the robot 6. The storage 61 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented balance control method for a biped robot, comprising:
    equivalenting a foot of a support leg of the biped robot to a massless link of a Linear Inverted Pendulum plus Flywheel Model, and equivalenting rest parts of the biped robot to a flywheel of the Linear Inverted Pendulum plus Flywheel Model; and
    controlling a posture of the foot of the support leg based on the Linear Inverted Pendulum plus Flywheel Model;
    wherein the controlling the posture of the foot of the support leg based on the flywheel model comprises:
    determining a first rotation matrix of the foot of the support leg in a world coordinate system;
    calculating a first posture angle of the foot of the support leg in the world coordinate system based on the first rotation matrix; and
    controlling the robot to apply a torque to the foot of the support leg according to the first posture angle; and
    wherein the determining the first rotation matrix of the foot of the support leg in the world coordinate system comprises:
    obtaining a second posture angle of a body of the robot in the world coordinate system;
    calculating a second rotation matrix of the body of the robot in the world coordinate system based on the second posture angle;
    determining a third rotation matrix of the foot of the support leg of the robot relative to the body of the robot according to forward kinematics; and
    calculating the first rotation matrix based on the second rotation matrix and the third rotation matrix.

2. The method of claim 1, wherein the calculating the second rotation matrix of the body of the robot in the world coordinate system based on the second posture angle comprises:
    calculating a roll angle rotation matrix, a pitch angle rotation matrix, and a yaw angle rotation matrix corresponding to a roll angle, a pitch angle, and a yaw angle in the second posture angle, respectively; and
    calculating the second rotation matrix based on the roll angle rotation matrix, the pitch angle rotation matrix, and the yaw angle rotation matrix.

3. The method of claim 1, wherein the calculating the first rotation matrix based on the second rotation matrix and the third rotation matrix comprises:
    calculating the first rotation matrix based on an equation of:

$Rfoot2world = Rbody2world \times Rfoot2body;$ where, Rbody2world is the second rotation matrix, Rfoot2body is the third rotation matrix, and Rfoot2world is the first rotation matrix.

4. The method of claim 1, wherein the calculating the first posture angle of the foot of the support leg in the world coordinate system based on the first rotation matrix comprises:
    calculating the first posture angle based on an equation of:

$\text{roll\_real} = a\tan2(R_{32}, \sqrt{R_{12}^2 + R_{22}^2});$ $\text{pitch\_real} = a\tan2(-R_{31}, R_{33});$ and $\text{yaw\_real} = a\tan2(-R_{12}, R_{22});$ where, $R_{ij}$ is the element in the i-th row and j-th column of the first rotation matrix, roll_real is the roll angle in the first posture angle, pitch_real is the pitch angle in the first posture angle, and yaw_real is the yaw angle in the first posture angle.

5. The method of claim 1, wherein the controlling the robot to apply the torque to the foot of the support leg according to the first posture angle comprises:

calculating the torque applied to the foot of the support leg by the robot according to equations of:

torque_$x$=$kp$_$x$×(roll_desired−roll_real); and torque_$y$=$kp$_$y$×(pitch_desired−pitch_real);

where, roll_real is the roll angle in the first posture angle, pitch_real is the pitch angle in the first posture angle, roll_desired is a preset desired value of the roll angle, and pitch_desired is a preset desired value of the pitch angle, kp_x and kp_y are preset proportional coefficients, torque_x is a component of the torque in an x-axis direction of a world coordinate system, and torque_y is a component of the torque in a y-axis direction of the world coordinate system.

6. A biped robot, comprising:
a processor;
a memory coupled to the processor;
a body;
two legs, wherein each of the two legs comprises a foot; and
one or more computer programs stored in the memory and executable on the processor;
wherein, the one or more computer programs comprise:
instructions for equivalenting a foot of a support leg of the biped robot to a massless link of a Linear Inverted Pendulum plus Flywheel Model, and equivalenting rest parts of the biped robot to a flywheel of the Linear Inverted Pendulum plus Flywheel Model; and
instructions for controlling a posture of the foot of the support leg based on the Linear Inverted Pendulum plus Flywheel Model.

7. The robot of claim 6, wherein the instructions for controlling the posture of the foot of the support leg based on the flywheel model comprise:
instructions for determining a first rotation matrix of the foot of the support leg in a world coordinate system;
instructions for calculating a first posture angle of the foot of the support leg in the world coordinate system based on the first rotation matrix; and
instructions for controlling the robot to apply a torque to the foot of the support leg according to the first posture angle.

8. The robot of claim 7, wherein the instructions for determining the first rotation matrix of the foot of the support leg in the world coordinate system comprise:
instructions for obtaining a second posture angle of a body of the robot in the world coordinate system;
instructions for calculating a second rotation matrix of the body of the robot in the world coordinate system based on the second posture angle;
instructions for determining a third rotation matrix of the foot of the support leg of the robot relative to the body of the robot according to forward kinematics; and
instructions for calculating the first rotation matrix based on the second rotation matrix and the third rotation matrix.

9. The robot of claim 8, wherein the instructions for calculating the second rotation matrix of the body of the robot in the world coordinate system based on the second posture angle comprise:
instructions for calculating a roll angle rotation matrix, a pitch angle rotation matrix, and a yaw angle rotation matrix corresponding to a roll angle, a pitch angle, and a yaw angle in the second posture angle, respectively; and instructions for calculating the second rotation matrix based on the roll angle rotation matrix, the pitch angle rotation matrix, and the yaw angle rotation matrix.

10. The robot of claim 8, wherein the instructions for calculating the first rotation matrix based on the second rotation matrix and the third rotation matrix comprise:
instructions for calculating the first rotation matrix based on an equation of:

$R$foot2world=$R$body2world×$R$foot2body;

where, Rbody2world is the second rotation matrix, Rfoot2body is the third rotation matrix, and Rfoot2world is the first rotation matrix.

11. The robot of claim 7, wherein the instructions for calculating the first posture angle of the foot of the support leg in the world coordinate system based on the first rotation matrix comprise:
instructions for calculating the first posture angle based on an equation of:

roll_real=$a$ tan 2($R_{32}$,$\sqrt{R_{12}^2+R_{22}^2}$);

pitch_real=$a$ tan 2(−$R_{31}$,$R_{33}$); and yaw_real=$a$ tan 2(−$R_{12}$,$R_{22}$);

where, $R_{ij}$ is the element in the i-th row and j-th column of the first rotation matrix, roll_real is the roll angle in the first posture angle, pitch_real is the pitch angle in the first posture angle, and yaw_real is the yaw angle in the first posture angle.

12. The robot of claim 7, wherein the instructions for controlling the robot to apply the torque to the foot of the support leg according to the first posture angle comprise:
instructions for calculating the torque applied to the foot of the support leg by the robot according to equations of:

torque_$x$=$kp$_$x$×(roll_desired−roll_real); and torque_$y$=$kp$_$y$×(pitch_desired−pitch_real);

where, roll_real is the roll angle in the first posture angle, pitch_real is the pitch angle in the first posture angle, roll_desired is a preset desired value of the roll angle, and pitch_desired is a preset desired value of the pitch angle, kp_x and kp_y are preset proportional coefficients, torque_x is a component of the torque in an x-axis direction of a world coordinate system, and torque_y is a component of the torque in a y-axis direction of the world coordinate system.

13. A non-transitory computer readable storage medium for storing one or more computer programs, wherein the one or more computer programs comprise:
instructions for equivalenting a foot of a support leg of a biped robot to a massless link of a Linear Inverted Pendulum plus Flywheel Model, and equivalenting rest parts of the biped robot to a flywheel of the Linear Inverted Pendulum plus Flywheel Model; and
instructions for controlling a posture of the foot of the support leg based on the Linear Inverted Pendulum plus Flywheel Model.

14. The storage medium of claim 13, wherein the instructions for controlling the posture of the foot of the support leg based on the flywheel model comprise:
instructions for determining a first rotation matrix of the foot of the support leg in a world coordinate system;
instructions for calculating a first posture angle of the foot of the support leg in the world coordinate system based on the first rotation matrix; and instructions for controlling the robot to apply a torque to the foot of the support leg according to the first posture angle.

15. The storage medium of claim 14, wherein the instructions for determining the first rotation matrix of the foot of the support leg in the world coordinate system comprise:
  instructions for obtaining a second posture angle of a body of the robot in the world coordinate system;
  instructions for calculating a second rotation matrix of the body of the robot in the world coordinate system based on the second posture angle;
  instructions for determining a third rotation matrix of the foot of the support leg of the robot relative to the body of the robot according to forward kinematics; and
  instructions for calculating the first rotation matrix based on the second rotation matrix and the third rotation matrix.

16. The storage medium of claim 15, wherein the instructions for calculating the second rotation matrix of the body of the robot in the world coordinate system based on the second posture angle comprise:
  instructions for calculating a roll angle rotation matrix, a pitch angle rotation matrix, and a yaw angle rotation matrix corresponding to a roll angle, a pitch angle, and a yaw angle in the second posture angle, respectively; and
  instructions for calculating the second rotation matrix based on the roll angle rotation matrix, the pitch angle rotation matrix, and the yaw angle rotation matrix.

17. The storage medium of claim 15, wherein the instructions for calculating the first rotation matrix based on the second rotation matrix and the third rotation matrix comprise:
  instructions for calculating the first rotation matrix based on an equation of:

$R\text{foot2world} = R\text{body2world} \times R\text{foot2body};$ where, Rbody2world is the second rotation matrix, Rfoot2body is the third rotation matrix, and Rfoot2world is the first rotation matrix.

18. The storage medium of claim 17, wherein the first rotation matrix, the second rotation matrix, and the third rotation matrix are all matrices with 3 rows and 3 columns.

19. The storage medium of claim 15, wherein the instructions for calculating the first posture angle of the foot of the support leg in the world coordinate system based on the first rotation matrix comprise:
  instructions for calculating the first posture angle based on an equation of:

$\text{roll\_real} = a\tan 2(R_{32}, \sqrt{R_{12}^2 + R_{22}^2});$ $\text{pitch\_real} = a\tan 2(-R_{31}, R_{33});$ and $\text{yaw\_real} = a\tan 2(-R_{12}, R_{22});$ where, $R_{ij}$ is the element in the i-th row and j-th column of the first rotation matrix, roll_real is the roll angle in the first posture angle, pitch_real is the pitch angle in the first posture angle, and yaw_real is the yaw angle in the first posture angle.

20. The storage medium of claim 15, wherein the instructions for controlling the robot to apply the torque to the foot of the support leg according to the first posture angle comprise:
  instructions for calculating the torque applied to the foot of the support leg by the robot according to equations of:

$\text{torque\_}x = kp\_x \times (\text{roll\_desired} - \text{roll\_real});$ and $\text{torque\_}y = kp\_y \times (\text{pitch\_desired} - \text{pitch\_real});$ where, roll_real is the roll angle in the first posture angle, pitch_real is the pitch angle in the first posture angle, roll_desired is a preset desired value of the roll angle, and pitch_desired is a preset desired value of the pitch angle, kp_x and kp_y are preset proportional coefficients, torque_x is a component of the torque in an x-axis direction of a world coordinate system, and torque_y is a component of the torque in a y-axis direction of the world coordinate system.

* * * * *